(12) United States Patent
Elliott

(10) Patent No.: US 8,544,609 B2
(45) Date of Patent: Oct. 1, 2013

(54) AUTOMATED VALVE STEM LUBRICATION SYSTEM

(75) Inventor: Lynn H. Elliott, Houston, TX (US)

(73) Assignee: Emerson Process Management Valve Automation, Inc., St. Louis, MO (US)

( * ) Notice: Subject to any disclaimer, the term of this patent is extended or adjusted under 35 U.S.C. 154(b) by 639 days.

(21) Appl. No.: 12/011,721

(22) Filed: Jan. 29, 2008

(65) Prior Publication Data

US 2008/0179140 A1 Jul. 31, 2008

Related U.S. Application Data

(60) Provisional application No. 60/898,466, filed on Jan. 31, 2007.

(51) Int. Cl.
*F16N 13/16* (2006.01)

(52) U.S. Cl.
USPC .................. 184/6.4; 184/6.1; 184/29

(58) Field of Classification Search
USPC ............ 184/6.4, 6.1, 29; 137/15.11, 312, 137/313
See application file for complete search history.

(56) References Cited

U.S. PATENT DOCUMENTS

| | | | | |
|---|---|---|---|---|
| 3,507,359 | A | * | 4/1970 | Warnock ........................... 184/6 |
| 4,429,591 | A | | 2/1984 | Zuch |
| 4,520,902 | A | * | 6/1985 | Snow ............................. 184/7.4 |
| 4,629,033 | A | * | 12/1986 | Moore et al. ................... 184/6.3 |
| 4,863,101 | A | | 9/1989 | Pater et al. |
| 5,060,761 | A | * | 10/1991 | Arndt et al. ................... 184/6.14 |
| 5,169,292 | A | * | 12/1992 | Loubier et al. .................. 417/63 |
| 5,497,852 | A | * | 3/1996 | Little et al. ..................... 184/7.4 |
| 5,503,180 | A | | 4/1996 | Nimberger |
| 5,769,182 | A | * | 6/1998 | Parenteau ...................... 184/6.4 |
| 6,424,928 | B1 | * | 7/2002 | Elliott et al. .................. 702/151 |
| 6,577,985 | B2 | | 6/2003 | Scalf |
| 6,615,156 | B2 | | 9/2003 | Elliott et al. |
| 7,353,835 | B2 | | 4/2008 | Elliott |

OTHER PUBLICATIONS

U.S. Appl. No. 60/898,466, filed Jan. 31, 2007, Elliott, Lynn H.
U.S. Appl. No. 11/982,797, filed Nov. 5, 2007, Elliott, Lynn H.
U.S. Appl. No. 60/650,398, filed Feb. 3, 2005, Elliott, Lynn H.
Elliott, Lynn H., EIM Controls Technical Reference Book, First Edition, Published in the United States, 1996.
Elliott, Lynn H., "EIM Controls Field Case Study (Phase 1 Report)", Published in the United States, Apr. 27, 2004.

\* cited by examiner

*Primary Examiner* — William E Dondero
*Assistant Examiner* — Robert T Reese
(74) *Attorney, Agent, or Firm* — Marshall, Gerstein & Borun LLP

(57) ABSTRACT

An at least partially automatic valve stem lubrication system including a source of grease lubricant, a pump and an at least partially automated control system, the control system structured and arranged such that lubricant is pumped onto a valve stem surface area as a function of the receipt of certain inputs.

15 Claims, 5 Drawing Sheets

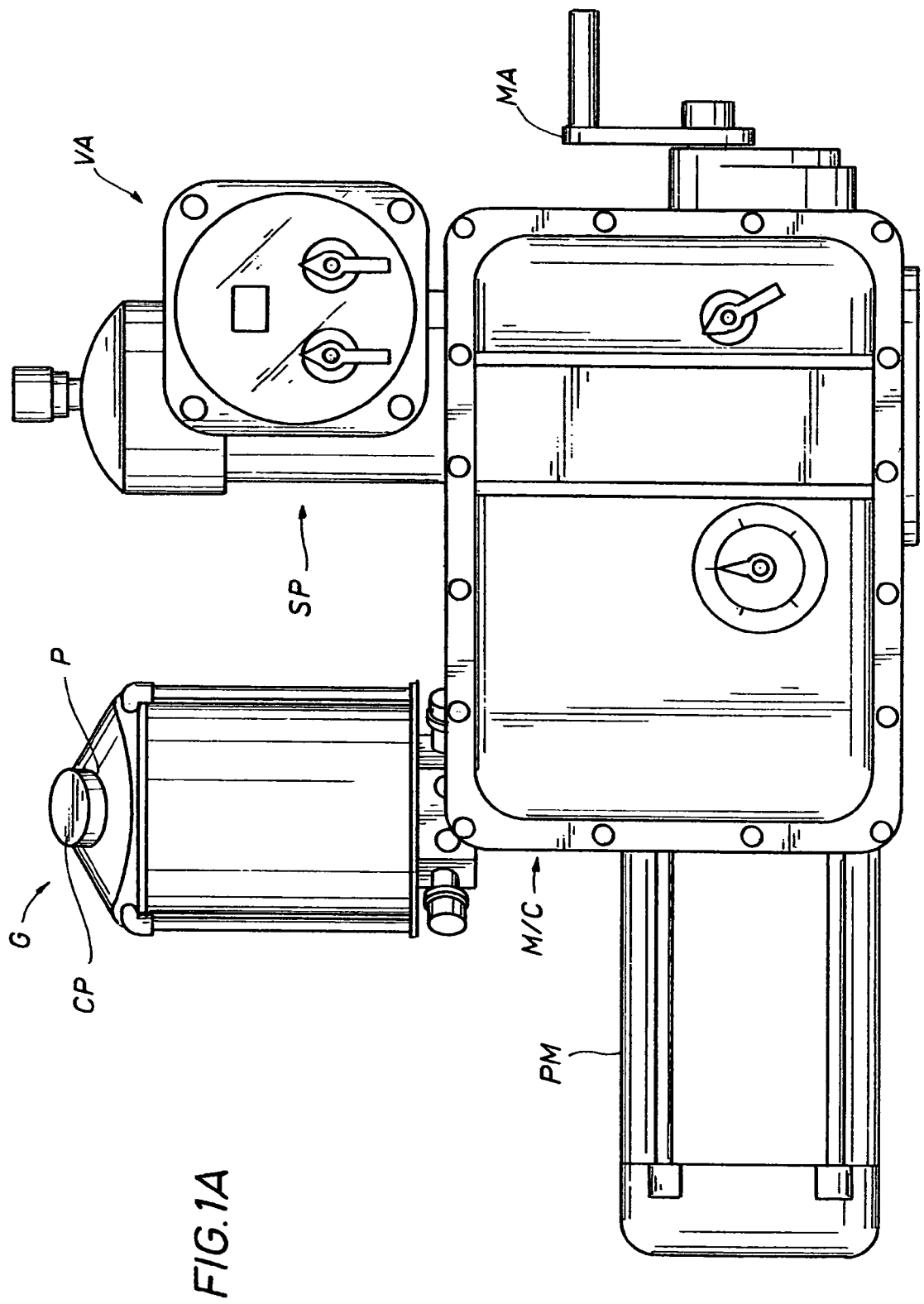

AUTOMATED VALVE STEM LUBRICATION SYSTEM

CROSS REFERENCE TO RELATED APPLICATIONS

This invention claims priority to U.S. provisional application Ser. No. 60/898,466 filed, Jan. 31, 2007, inventor Lynn H. Elliott, entitled Actuator Valve Stem Lubricator System. This invention hereby incorporates by reference, in its entirety, co-pending applications Ser. No. 11/335,364, filed Jan. 19, 2006, entitled Improved Valve Stem Protection, inventor Lynn H. Elliott, and Ser. No. 11/982,797, filed Nov. 5, 2007, entitled Draining System for Valve Actuator/Valve Stem Protector Assemblies, inventor Lynn H. Elliott.

FIELD OF THE INVENTION

The field of the invention lies in the maintenance and protection of valve stems, and in particular in the lubrication of areas of contact between gate and sluice valve stems and valve actuators or stem nuts.

BACKGROUND OF THE INVENTION

It has been discovered by the instant inventor that a common cause of valve, or valve actuator, malfunction arises from the fact that the valve stem with which the actuator interacts has been allowed to become frozen, due to corrosion and contamination. This is especially true with large municipal systems such as the New York City wastewaters systems, having hundreds of sluice gates and where full periodic maintenance is difficult to effect.

Typically the actuator functions by turning a nut to provide valve stem thrust.

Manufacturers of valves and valve actuators instruct that the valve stem, and that in particular the valve stem/valve actuator connection region and nut, be periodically lubricated. However, in practice, this requirement for lubrication has become difficult to satisfy. There are too many gates and not enough personnel, and the locations required for the application of the lubricant is frequently very inconvenient or difficult to reach.

The instant invention proposes, therefore, an at least partially automated valve stem lubrication system. In accordance with the instant invention a lubricant source and a control system are provided such that, upon the receipt of proper input, the control system initiates the supply of lubricant from the source to portions of the valve stem surface. The invention preferably includes activating a pump and motor associated with, and in fluid communication with, the lubricant source. The system preferably automatically supplies lubricant upon receiving a proper "start" input signal, such as a signal that the actuator is moving and/or that the valve stem is operating within a certain range and/or position information and/or stored valve activation and maintenance history information and/or inputs from outside sources.

SUMMARY OF THE INVENTION

The invention involves an at least partially automated valve stem lubrication system that includes a source of grease lubricant in fluid communication with valve stem surface areas. A pump, connected to a source of power, is in fluid communication with the lubricant and an at least partially automated control system. The control system is in communication, directly or indirectly, with the pump and/or its source of power as well as with at least one source of a start input. The automated control system is structured and arranged with respect to the lubricant source, power source and pump combination such that the pump pumps lubricant onto a valve stem surface area upon receipt of, or at least within a period of time of the receipt of, a start input.

In preferred embodiments sources of lubricant include a chamber or a cartridge. The source of lubricant is preferably replenishable and/or replaceable. Preferably the source of lubricant is located at or near the valve or valve actuator.

The source of pump power is preferably a motor. In a preferred embodiment the motor is a 24 volt DC motor but could be an electric motor or hydraulically actuated motor or a hydraulic over electric motor. A valve actuator could charge batteries of a DC motor or supply the 24V source.

Preferably an at least partially automated control system includes an electric or electronic program with a start algorithm, the algorithm being a function of one or more start inputs. The program might also include a stop algorithm, also a function of one or more inputs. The one or more inputs could include start triggers and stop triggers that are a function of valve and/or valve actuator operation. The one or more inputs could also include a clock input and a memory input and a input from outside sources.

BRIEF DESCRIPTION OF THE DRAWINGS

A better understanding of the present invention can be obtained when the following detailed description of the preferred embodiments are considered in conjunction with the following drawings, in which:

FIGS. 1A, 1B and 1C offer three views of a preferred embodiment of the instant invention, providing an automated lubrication system attached to a valve actuator.

The drawings are primarily illustrative. It would be understood that structure may have been simplified and details omitted in order to convey certain aspects of the invention. Scale may be sacrificed to clarity.

DETAILED DESCRIPTION OF PREFERRED EMBODIMENTS

The preferred embodiment of FIGS. 11A, 11B and 11C illustrates a valve actuator VA having a stem protector SP for enclosing portions of a stem S of a valve, the valve and stem not being shown in the Figures. Associated with the valve actuator and stem protector is a lubricant system G, sometimes referred to as a "greater," having a lubricant chamber GC being relatively closely associated with the valve actuator and stem protector in the instant embodiment. The lubricant chamber is in fluid communication with valve stem surface area, and/or actuator nut or area of contact between the stem and valve actuator, through a line L porting from the "greaser" chamber into the stem protector chamber.

An approximately 24 volt DC motor M (not shown) is associated with the greater in the preferred embodiment and is housed, together with a suitable pump (also not shown), in casing C or in an actuator casing. A source of electric power, and/or a power line, not shown, would be provided to the casing. The motor in the preferred embodiment runs a small (in the order of 1 cc) fixed displacement pump associated with the lubricant. An electronic control system (not shown) is associated with the motor and pump. The control system could be housed with the valve actuator. The electronic control system receives inputs, preferably from the valve actuator. The electronic control system might be integrated into the valve actuator casing C or be independently housed in an enclosure coupled to the actuator (not shown.)

Figure 1B:
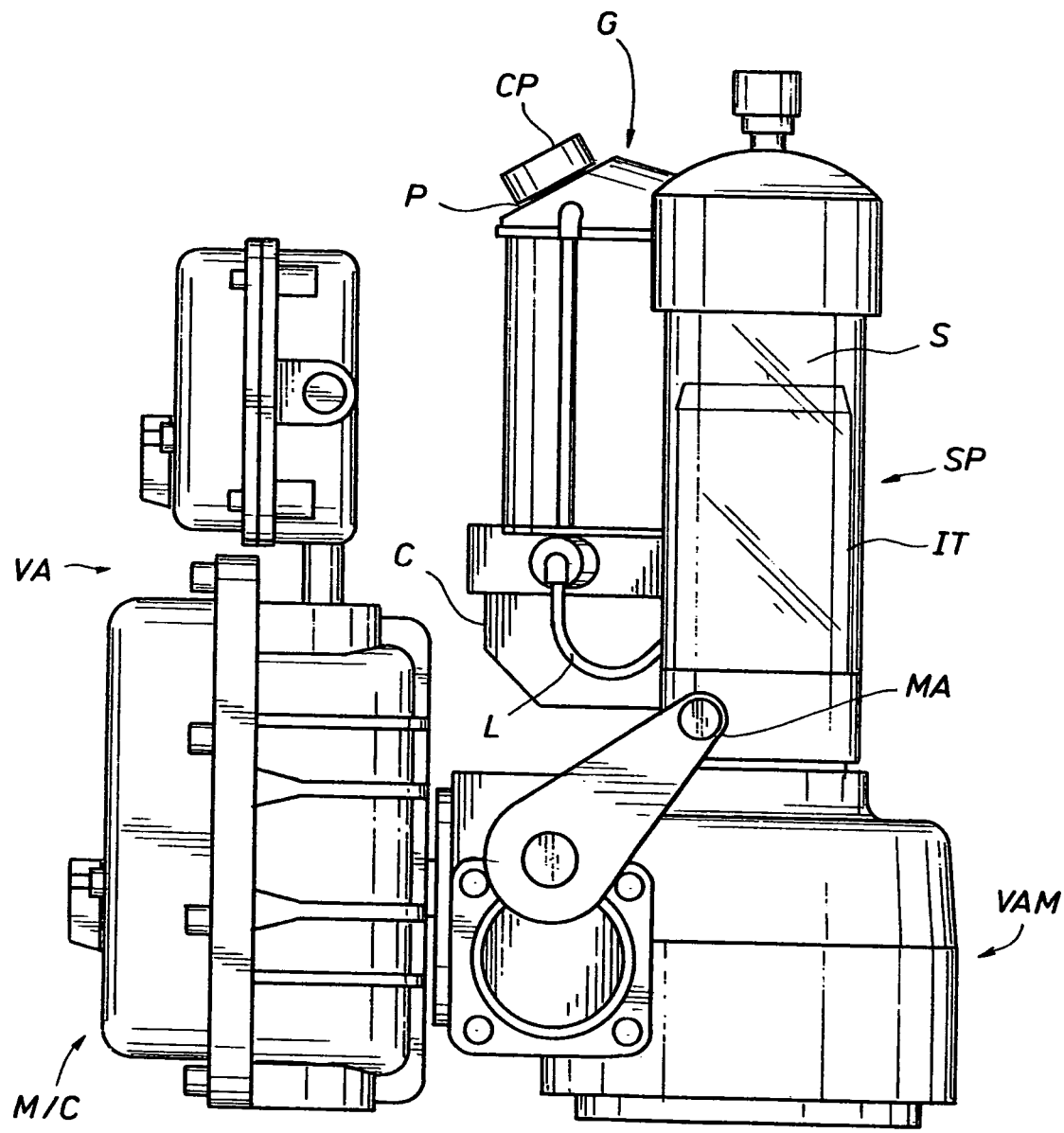
Figure 1C:
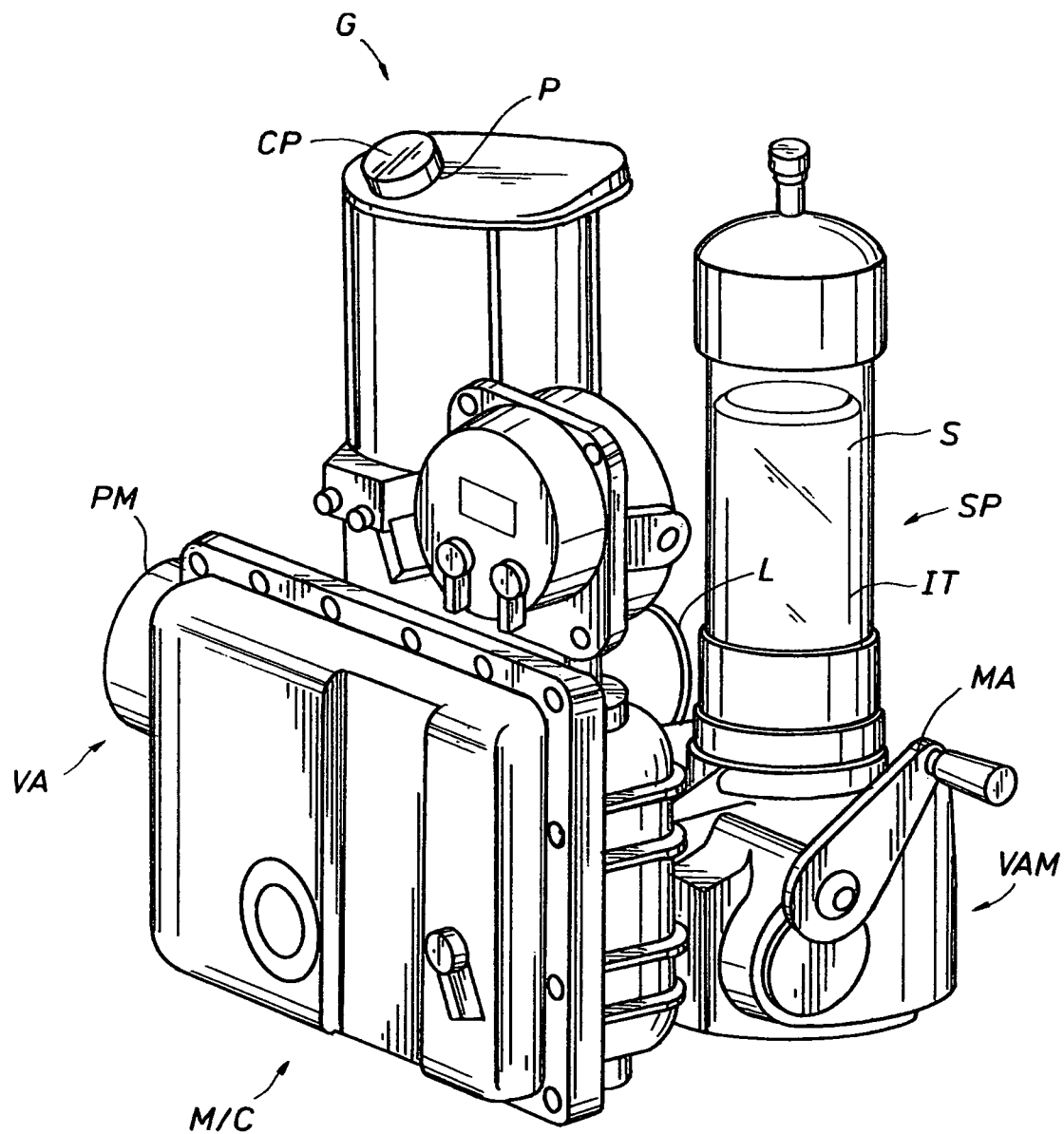
Figure 2:
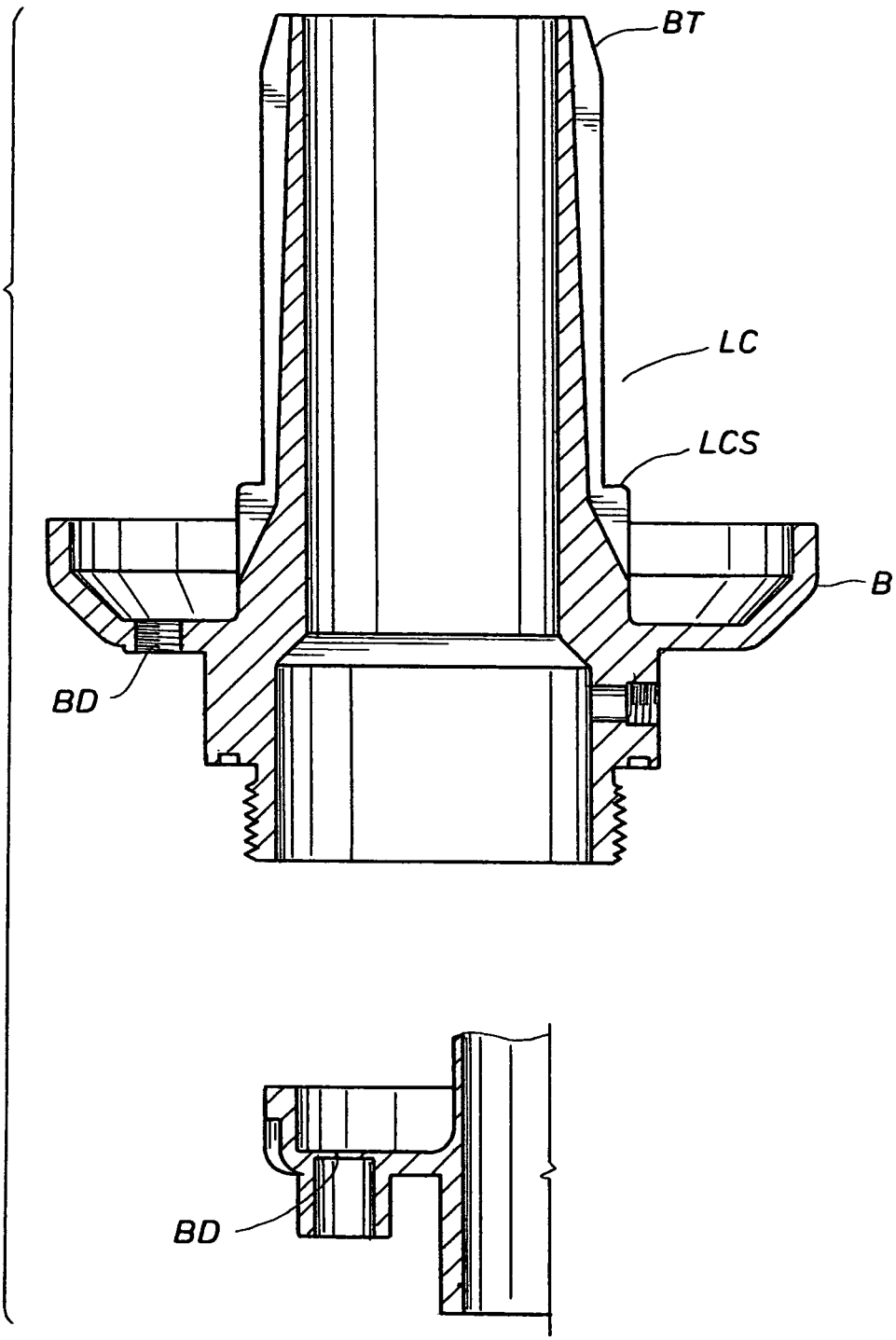
FIG. 2 illustrates a preferred valve stem protector having a bowl for disposal to separate containers not only of condensation drained from the inside walls of a stem protector but as well as for excess lubricant collected between a stem and a stem protector using the automated lubrication system. The bowl may have additional drains to control water drainage or capture excess lubrication.
Figure 3B:
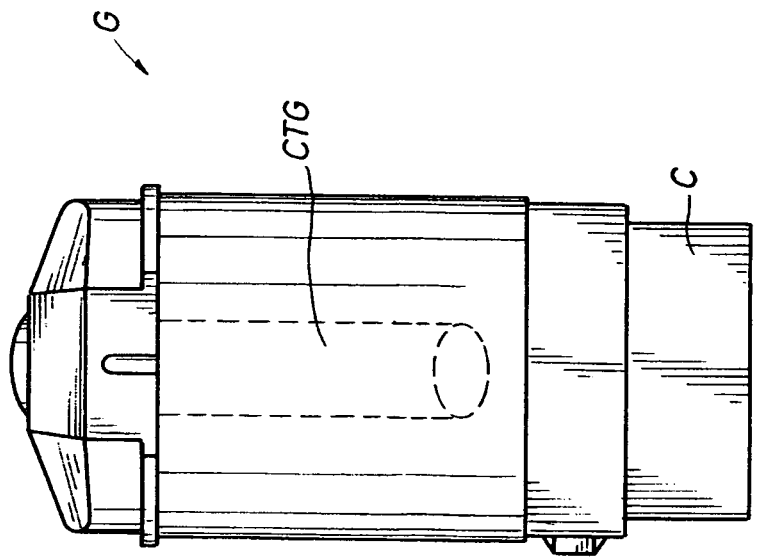
FIGS. 3A and 3B illustrate two views of a preferred lubricant accumulator embodiment having a casing compartment for housing an associated motor and pump.
Figure 3A:
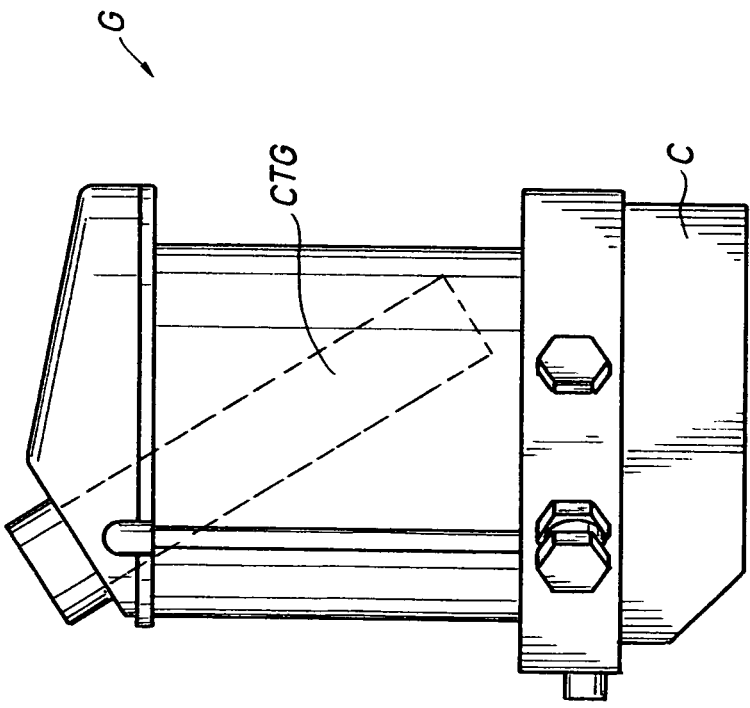

The chamber of the "greater" can be replenished with lubricant through an upper port P covered with a cap CP. A channel is preferably provided in the lubricant chamber to receive and discharge a cartridge of lubricant. Good quality grease of grade NGL1 0 to NGL1 2 is preferable. The greater G is more particularly illustrated in FIGS. 3A and 3B.

The preferred "Greater Auto Stem-A-Lube" is designed to provide grease up to NLG1 2 to a Stem-A-Lube or distribution block. Controls in the valve actuator preferably determine the quantity of grease delivered to the stem or other device, such as an anti-rotation nut.

The "Greaser" is a product which preferably combines a two filtration process with a powerful piston delivery element to give a rugged pump station to deliver grease to a valve stem, preferably through a Stem-A-Lube fitting port. The "Greaser" may be mounted on a valve actuator or mounted up to 30 feet away in a convenient location.

The "Greater" Auto Stem-A-Lube has two methods of filling. It may be filled by a standard grease cartridge or by a grease gun/volume filler through a grease fitting on the chamber body.

In operation, according to preset conditions, such as when the actuator is operating or when the actuator is operating within a certain range of the valve and valve stem, input signals are sent to the "greater" motor such that a start signal triggers the motor to begin pumping lubricant from the greater chamber through the communication line to surface areas of the valve stem, preferably within a valve stem protector chamber. A stop algorithm and/or a timing signal signals the pump motor to stop.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. An automated industrial gate or sluice valve stem lubrication system, comprising:
   a valve actuator coupled to a valve stem, the valve stem having a valve stem surface;
   a source of grease lubricant, wherein the lubricant is in fluid communication with the valve stem surface,
   a pump operatively coupled to a motor, wherein the lubricant flows through the pump such that the pump is in fluid communication with the lubricant;
   an at least partially automated control system in communication with at least one of the pump and the motor, and in communication with a source of at least one start input, wherein the at least one start input is one of a signal that the valve actuator is moving, a signal that the valve stem is in a desired position, and a signal providing stored valve actuation history; and
   wherein the automated control system is structured and arranged with respect to the source/motor/pump combination such that the pump pumps lubricant onto the valve stem surface upon receipt of, or at least within a given time of receipt of, the at least one start input.

2. The system of claim 1 wherein the source of lubricant includes a chamber.

3. The system of claim 1 wherein the source of lubricant includes a cartridge.

4. The system of claim 1 wherein the source of lubricant is replenishable and/or replaceable.

5. The system of claim 1 wherein the source of lubricant is located at the gate or sluice valve or valve actuator.

6. The system of claim 1 wherein the source of lubricant is located remote from, but within 30 feet from, the gate or sluice valve and valve actuator.

7. The system of claim 1 wherein the motor is an electric motor.

8. The system of claim 7 wherein the motor includes a 24 volt DC motor.

9. The system of claim 1 wherein the motor includes a hydraulically actuated motor.

10. The system of claim 1 wherein the at least partially automated control system includes an electronic program.

11. The system of claim 10 wherein the program includes a start algorithm, the start algorithm a function of the at least one start input.

12. The system of claim 11 wherein the at least one start input includes one or more start triggers.

13. The system of claim 10 wherein the electronic program includes a stop algorithm, the stop algorithm a function of at least one stop input.

14. The system of claim 13 wherein the at least one stop input includes one or more stop triggers.

15. The system of claim 1 wherein the control system is one of integrated into a valve actuator casing and housed in an enclosure coupled to the valve actuator.

* * * * *